Figure 1:
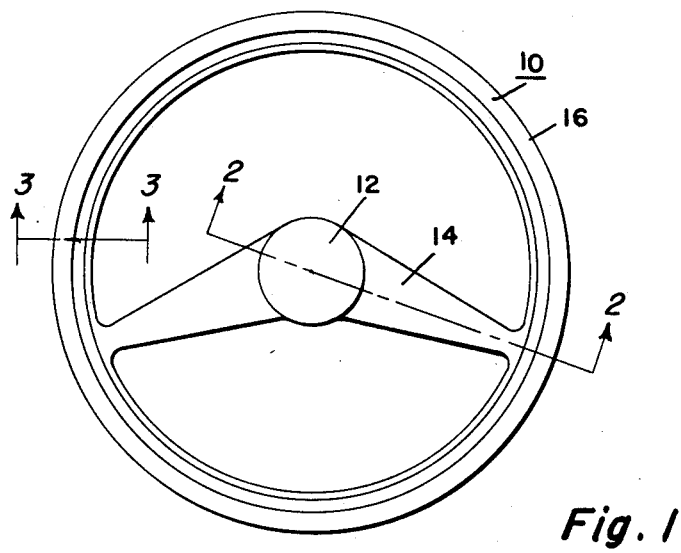

INVENTOR.
Walter G. Kniffin, Jr.
BY
His Attorney

June 28, 1960　　　W. G. KNIFFIN, JR　　　2,943,164
WHEEL AND HORN SWITCH ASSEMBLY
Filed July 28, 1958　　　　　　　　　　　　2 Sheets-Sheet 2

INVENTOR.
Walter G. Kniffin, Jr.
BY
John T. Marvin
His Attorney

United States Patent Office 2,943,164
Patented June 28, 1960

2,943,164
WHEEL AND HORN SWITCH ASSEMBLY
Walter G. Kniffin, Jr., Dayton, Ohio, assignor to General Motors Corporation, Detroit, Mich., a corporation of Delaware Filed July 28, 1958, Ser. No. 751,526
8 Claims. (Cl. 200—61.57)

This invention relates to an improved steering wheel and horn blowing mechanism, and particularly to a rim section structure relative to which a compact horn blowing mechanism is mounted.

An object of this invention is to provide a steering wheel having a rim section including a molded portion of resilient material adapted to receive a snap-in more resilient structure removable as a unit and containing horn blowing contact and ring means.

Another object of this invention is to provide an improved steering wheel and horn switch assembly including a steering wheel rim section of resilient material completely covering a metal core therein and having a recess portion provided with sides formed as undercut shoulders relative to which a ring of elastomeric relatively softer and more resilient material is adapted to be locked, the ring having at least five internal slots, one of which is adapted to hold an annular spring resiliently in the relatively softer material intermediate a pair of unoccupied slots while a remaining pair of slots are longitudinally aligned relative to each other in a plane located a predetermined distance from the annular spring means so that the spring means is always spaced the same distance from an annular plate inserted relative to the longitudinally aligned slots eliminating other than equal spacing which would make closing of contact for horn blowing difficult.

Another object of this invention is to provide a horn blowing switch assembly including an annular ring of resilient and relatively soft elastomeric material substantially C-shaped in cross section and having five inwardly located slots, one intermediate slot being defined by a substantially cylindrical surface open laterally for less than 180° so as to provide projections extending toward each other and adapted for retaining an annular spring in the intermediate slot in a location such that an arcuate portion of the spring projects beyond a surface formed by each projection, a pair of empty slots extending into the ring on opposite sides of the projections and serving to increase flexibility and resilience of the ring adjacent to the intermediate slot containing the spring, and a pair of coplanar slots adapted to receive and retain an annular plate in equi-spaced relation to the spring as a horn blowing switch mechanism replaceable as a unit due to shoulders of resilient material integral with the annular ring and adapted to lock resiliently relative to an undercut portion of a steering wheel covering of resilient material surrounding a completely covered metal reinforcing core.

A further object of this invention is to provide a horn blowing switch mechanism including as a compact and replaceable unit an annular ring of resilient elastomeric material containing deflectable spring means partially embedded in a central portion of the ring and retaining an annular metal plate at a constant predetermined distance relative to the spring means which is substantially concentrically located relative to the plate which is insulated from and located intermediate the spring means and a core of a rim of the steering wheel covered with relatively hard resilient material adapted to dove-tail in locking engagement with the annular elastomeric ring.

Further objects and advantages of the present invention will be apparent from the following description, reference being had to the accompanying drawings wherein a preferred embodiment of the present invention is clearly shown.

Figure 2:
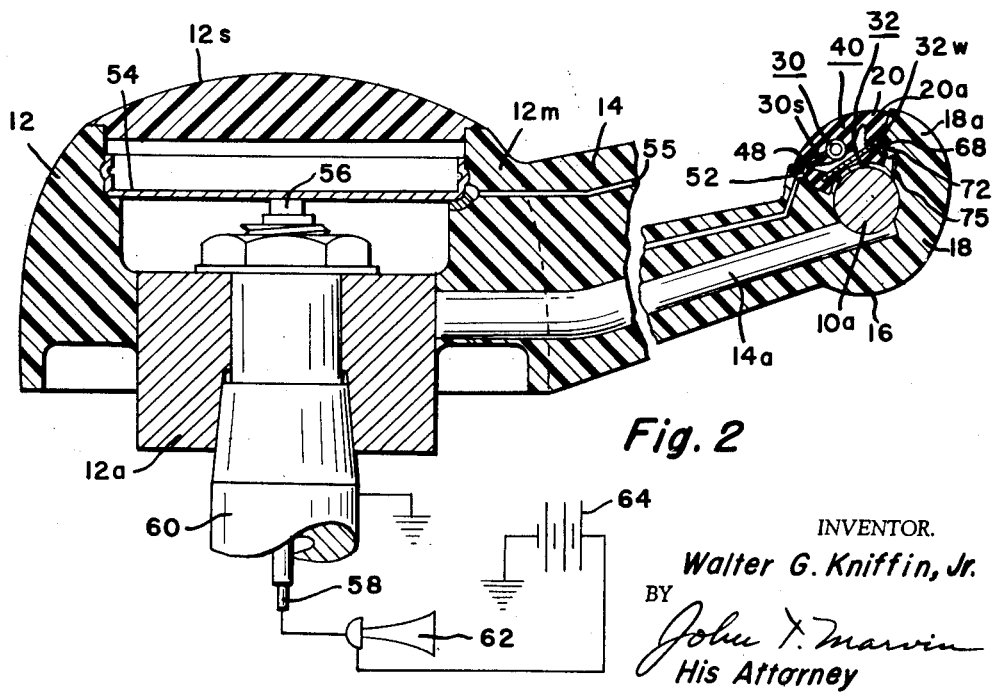
Figure 3:
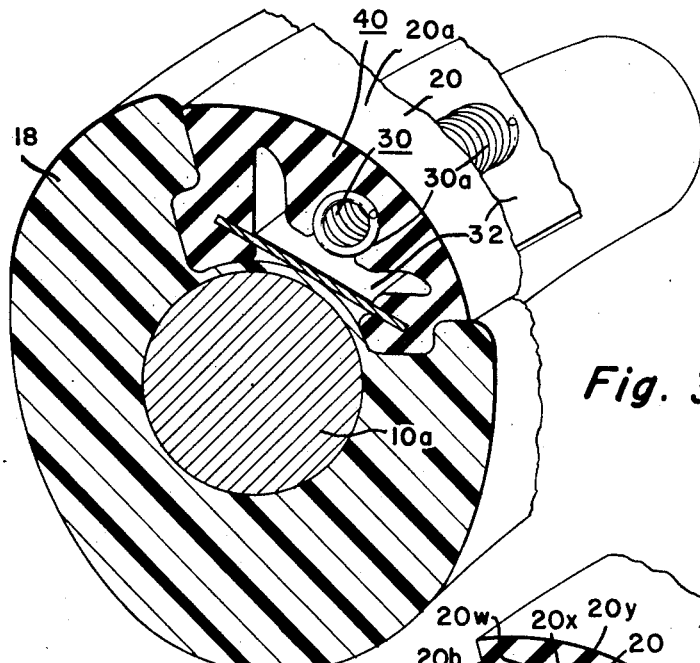
Figure 3A:
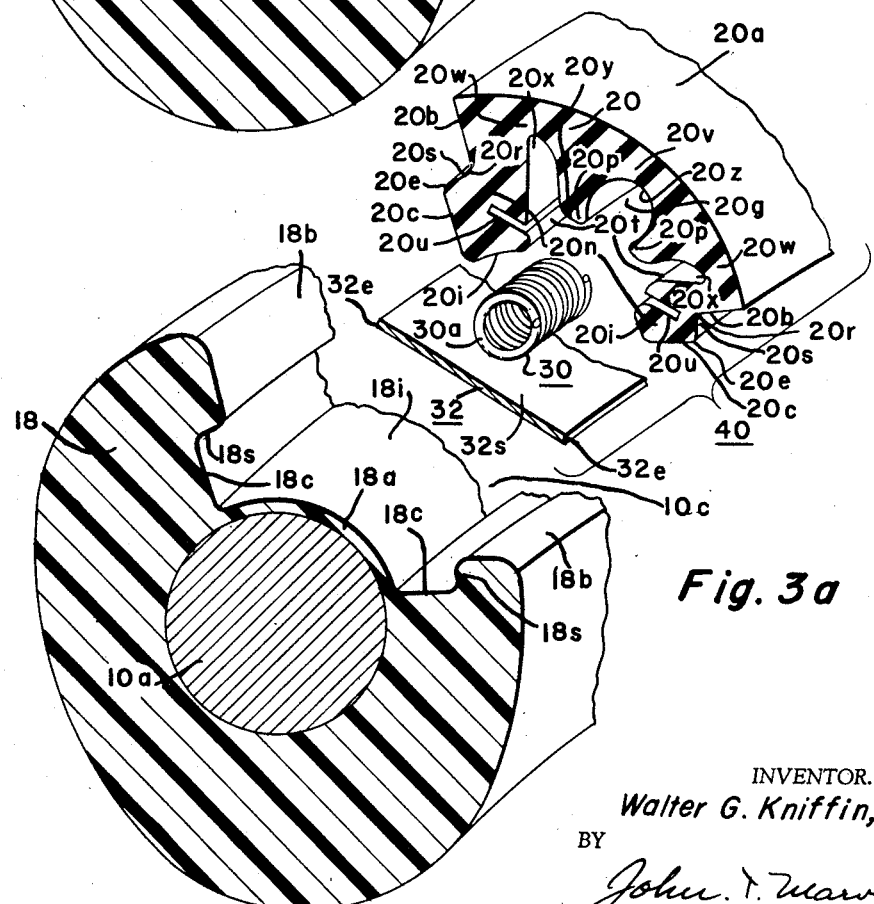

In the drawings:
Figure 1 is a top view of a steering wheel and horn blowing mechanism in accordance with the present invention.
Figure 2 is a cross-sectional elevational view taken along line 2—2 in Figure 1.
Figure 3 is an enlarged cross-sectional elevational view taken along line 3—3 in Figure 1.
Figure 3a is an exploded fragmentary, perspective, and cross-sectional view of the steering wheel and horn blowing mechanism parts shown in Figure 3.

Referring to the drawings, Figure 1 illustrates a steering wheel embodying the present invention which involves an annular portion or rim generally indicated by numeral 10 and a hub or central portion 12 connected by a plurality of spokes 14 forming a steering means covered by a relatively thick rubber-like material.

The present invention involves elimination of a conventional external horn blowing ring and a provision of a compact and unitary completely removable horn blowing mechanism completely within a soft rubber portion of the steering wheel rim cover that faces a motor vehicle operator. An embodiment of this structure is shown in Figure 2 wherein the rim 10 is formed of lower and upper portions 18 and 20 respectively. The lower portion 18 consists of a non-metallic mass, as for example hard rubber, as well as a metal insert or annular core 10a fully embedded in the rubber or elastomeric material in accordance with the present invention. The core 10a is connected to a metallic hub insert 12a by means of a plurality of metal spokes 14a and the latter elements are molded within a non-metallic mass formed integrally with the non-metallic cover material of the lower portion 18 of the steering wheel. The non-metallic mass of lower portion 18 and the non-metallic mass covering the spokes and hub insert 12a may be made of rubber-like material or various moldable plastic materials such as hard rubber, the hard rubber being preferred because it is inexpensive and because the mold flash incident to the molding thereof can be readily trimmed.

The upper portion 20, in accordance with the present invention, is molded as a ring or annular portion of elastomeric relatively softer and more resilient material than the material used for making and covering the lower portion of the steering wheel rim, spokes, and hub structures. The upper portion or ring 20 is separately formed of a soft rubber-like material and is provided with a plurality of slots and shoulder means to be described more fully below. A soft rubber recipe which may be used may include 48.35 parts natural rubber, 2 parts stearic acid, 40 parts zinc oxide, 6.60 parts titanium dioxide, 1.5 parts sulfur, .5 parts palm oil, .5 parts anti-oxidant, .5 parts Altax accelerator (benzo-thiazol), .05 parts Tuads accelerator (tetramethylthiuram disulfide). Other soft rubber recipes well-known in the art and including butadiene-acrylonitrile copolymer, natural rubber, polychloroprene, mixtures of these materials, and other resilient rubber-like materials may be used.

An example of a suitable hard rubber recipe which may be used for the steering wheel rim lower portion may include about 78 parts CRS (a butadiene-styrene copolymer) 64 parts ground rubber scrap, 18 parts hard carbon black, 21 parts hydrocarbon oil, 200 parts ground limestone, 12 parts mineral bitumin, 4 parts organic accelerator, 7.5 parts hydrated calcium oxide, 45 parts zinc oxide, and 22 parts sulfur. Other hard rubber recipes well-known in the art may be used as other well-known moldable plastic materials which on curing form a hard, rigid, mass having limited resilience.

The annular portion or ring 20 of elastomeric material is best visible in Figures 3 and 3a of the drawings. The rim section 20 seen in Figure 3a includes an outer semi-annular surface 20a which is adapted to be recessed relative to an outer annular surface 18a formed by the lower portion 18 of the rim as shown in Figure 2. It is to be understood that the elastomeric ring 20 is made of a relatively soft resilient material and is molded to have a pair of radially extending walls 20b which are parallel to and complementary to outer radial walls 18b formed by the lower portion 18 as best seen in the exploded view of Figure 3a and in Figure 3. The lower portion 18 is molded of the relatively harder rubber-like material and the annular metal core 10a is completely embedded therein. A segment 18a of the lower portion 18 serves to enclose a side of the metal core 10a adjacent to a cutout portion or recess 10c of the rim 10. Extending substantially radially outwardly from the metal core 10a is an intermediate or inner radially extending wall portion 18c provided in a location slightly offset angularly from each of the outer radial wall portions 18b. This angular offset location of the inner radial wall portions 18c permits a shoulder 18s to be formed between the inner and outer radial walls 18c and 18b respectively. The annular ring or rim section 20 is provided with a pair of angularly spaced walls 20c adapted to be parallel to and complementary with the radial walls 18c of the lower portion 18. Shoulders 20s formed by the molded ring or rim section 20 between each of the inner and outer radial walls 18c and 18b are adapted to be locked resiliently underneath the shoulders 18s of the lower portion 18.

The ring or annular rim section 20 is further formed so as to provide a radially inner curved surface 20i along a wall immediately adjacent to each of the radially inner walls 20c and adapted to be complementary to a semi-annular or curved intermediate surface 18i formed with the portion 18a of the lower portion 18 that completely surrounds and encases the metal core 10a. The enlarged views of Figures 3 and 3a best illustrate the specific configuration and relationship of ring 20 relative to the rim or lower portion 18.

In a preferred embodiment of the present invention, the ring or rim section 20 is formed to provide at least five inwardly located slots. One intermediate slot 20z has a substantially cylindrical surface forming a recess open laterally or radially inwardly at a gap 20g extending for less than 180° so as to provide a pair of projections 20p extending toward each other and adapted for retaining an annular spring or flexible metallic horn actuating means generally indicated by numeral 30 as shown in the drawings. The spring means 30 is preferably an annular coiled spring which is adapted to be retained in the intermediate slot 20z in a location such that a lower arcuate portion 30a of the spring projects beyond a surface 20y formed adjacent to each projection 20p. This surface 20y on opposite sides of the intermediate slot 20z extends in opposite directions and provides a pair of empty or unoccupied slots 20x extending laterally and radially outwardly relative to the gap 20g. The pair of empty slots can be alike in cross section or can differ. These empty slots preferably terminate adjacent to thin wall portions 20w just below the surface 20a of the annular ring or rim section 20. The purpose of the empty slots 20x is to increase flexibility and resilience of the ring or rim section 20 on opposite sides adjacent to the intermediate slot 20z that contains the spring means 30. Horn actuation is effected by pressing on the surface 20a intermediate the walls 20w and preferably along a central wall portion 20v adjacent to the intermediate slot 20z.

As part of the compact and unitary horn blowing assembly, in accordance with the present invention, the ring or rim section 20 is provided with an additional pair of side slots or undercut grooves 20u which are formed to lie in a plane transverse to a radius which would extend outwardly from the central metal core 10a to the outer surface 20a. This radius to which the plane of the undercut grooves 20u is transverse preferably intersects the intermediate slot 20z and the spring means 30 contained therein. The undercut grooves or side slots 20u are longitudinally aligned relative to each other in this plane located a predetermined distance from the annular spring means 30 so that the spring means is always spaced the same distance from an annular metal plate generally indicated by numeral 32 inserted relative to the longitudinally aligned slots. The undercut grooves or side slots 20u extend laterally into flanges or auxiliary body portions 20n of the ring or rim section 20. Each of the auxiliary body portions 20n is adapted to form one of the shoulders 20s mentioned earlier and each auxiliary body portion can be resiliently snapped into locking engagement relative to the lower portion 18 whereby a dove-tailing occurs between shoulders 18s and shoulders 20s.

The annular plate 32 has a pair of opposite flat surfaces 32s and opposite annularly extending edges or ends 32e. The opposite ends 32e extend into the undercut slots 20u and one surface 32s remote from the metal core 10a lies intermediate a pair of radially extending wall sections 20t immediately adjacent to an open end of each of the undercut slots 20u. This surface 32s is adapted to be engageable by the exposed arcuate portion 30a of the spring means 30 whenever the ring or rim section 20 is pressed radially inwardly relative to the flat plate 32. The spring means 30 is substantially concentrically located relative to the plate 32 which is insulated or spaced from and located intermediate the spring means 30 and metal core 10a.

The presence of the plate 32 in the undercut slots 20u serves a function electrically so far as horn blowing actuation is concerned and also mechanically so far as interlocking of the shoulders 18s and 20s is concerned. Due to the fact that the ring or rim section 20 is made of soft resilient material, the shoulder 20s can be easily snapped and locked into engagement with the shoulders 18s. The ends 32e of the flat plate 32 project toward a corner or radius 20r intermediate the shoulder 20s and radially outer walls 20b. However, the ends 32e lie in the same plane with the plate 32s and the corners 20r are slightly radially farther out than the ends 32e which in turn are radially farther out than corners or ends 20e providing an annular edge intermediate the shoulders 20s and radially inner walls 20c. Thus, the plane of the plate 32 if extended would intersect a surface of the shoulders 20s and shoulders 18s when interlocking action therebetween is effected as illustrated by the cross-sectional views in Figures 2 and 3. Presence of the ends 32e relative to the auxiliary body portion 20n assures reinforcement of the soft resilient material thereof sufficient to effect a positive locking action between shoulders 20s and shoulders 18s.

As shown in Figure 3a, the surface 32s of the plate 32 on the side of the plate near the metal core 10a can abut tangentially against the intermediate surface 18i provided by the auxiliary portion 18a of the harder resilient material surrounding the core 10a. Thus the plate 32 is supported in a three contact type of arrangement provided by the intermediate support or backing of the intermediate surface 18i and opposite end supports relative to ends 32e inserted relative to the undercut grooves or side slots 20u. The ends 32e enhance rigidity of the auxiliary body portions 20n and the empty slots 20x serve to provide narrow walls 20w for enhancing resiliency of the central wall 20v relative to the spring means 30 inserted in the intermediate slot 20z.

The fragmentary exploded view of Figure 3a illustrates a horn blowing assembly generally indicated by numeral 40. This horn blowing assembly 40 consists of the ring or annular rim section 20 provided with at least five slots as described above and including the spring means 30 as well as the flat annular plate 32. The horn blowing means 40 is assembled as shown in the cross sectional views of Figures 2 and 3 so as to provide a compact and unitary annular structure which can be inserted and locked into engagement by use of the shoulders 18s and 20s described above. The horn blowing assembly 40 is provided to be removable as a unit and replaceable by a similar unit in case an electrical defect or circuit failure occurs therein. The plate 32 always forms one side of a horn blowing circuit and in accordance with the present invention is always spaced the same distance from the spring means 30 which is part of the other side of the circuit. Previously, steering wheels have been provided with horn blowing circuits in which a part thereof is formed by an annular spring means adapted to be contacted directly relative to a core reinforcement member such as the metal core 10a. However, previous types of steering wheel structures in which the spring directly engages a core have proved unsatisfactory because a core such as the metal insert 10a frequently can shift in a mold so that distances between the spring means and such a core are not always equal. Flash of molded resilient material can also cover part of metal core 10a and prevent good electrical contact. When the distances between the spring means 30 and a core such as 10a are not equal, pressure required for actuating the horn blowing means varies throughout an annular periphery of a rim section such as 20 and there is difficulty in establishing a closed electrical circuit in certain positions. Furthermore, the present invention provides a unitary and compact horn blowing assembly 40 which can be removed in one piece and replaced by a similar horn blowing assembly resiliently engageable relative to the shoulders 18s. In most instances, the locking engagement of shoulders 18s and 20s combined with the enhancement of locking engagement as effected by presence of ends 32e of the flat plate 32 is sufficient to form the structure illustrated by the cross-sectional views of Figures 2 and 3. However, it is to be understood that a suitable cement can be provided between the surfaces of walls 18b and 18c as well as shoulders 18s relative to corresponding walls 20b, 20c, and shoulders 20s, respectively.

As best seen in Figure 2, the spokes 14 are integral with a central non-metallic mass 12m surrounding the hub 12. Preferably a top surface 12s of the hub 12 is made of soft resilient material adapted to absorb shocks in a manner similar to absorption of shocks by a crash pad. A foam material can be used to provide a top cover and top surface 12s of the hub 12.

The spring means 30 which forms a movable connection of the horn actuating mechanism is shown in both Figures 2 and 3 in assembled relationship at a predetermined distance away from the flat annular plate 32. As shown in Figure 2, the spring means 30 is electrically connected by a wire 30s to a socket 48 provided along a radial outer wall 20b of the annular ring or rim section 20. The socket 48 receives a plug 52 partially embedded in radially outer wall 18b of the lower portion 18. The plug 52 is connected to a metal cup-like member 54 supported within the hub by means of a lead 55 embedded in a spoke. The cup member 54 is electrically connected to an end 56 of a lead 58 which is passed through a bore in a shaft 60 and is insulated therefrom. The lead 58 is electrically connected to a battery 64 having one terminal thereof grounded.

The plate 32 is connected by a wire 32w to a socket 68 provided adjacent to a radially inner wall 20c of the ring or rim section 20. The socket 68 receives a plug 72 partially embedded in a wall 18c of the lower rim portion. The plug 72 is connected by means of a lead 75 to the metal core 10a which in turn is connected through a metal reinforcing portion of the spoke to the hub portion 12a electrically connected with shaft 60 to ground.

To operate the horn, it is only necessary to apply finger pressure on the outer surface 20a intermediate the thin wall portions 20w located radially outside the empty slots 20x. Preferably this single pressure is applied adjacent to the intermediate wall portion 20v and effects movement of the spring means 30 into contact with the one surface 32s of the plate 32 to close an electrical circuit and to energize a horn. Due to the fact that the surface 20a is recessed slightly radially inwardly from the outer surface 18a of the lower portion, the horn blowing assembly 40 can be readily located by an operator as fingers are moved relative to a horn blowing area between the wall portions 20w. The horn blowing area is formed of relatively soft and resilient elastomeric material adjacent to an upper surface of the steering wheel. This relatively soft resilient material of the horn blowing area permits horn actuation or energization with a pressure sufficient to displace the spring means 30 relative to the flat annular plate 32. The relatively soft resilient elastomeric material adjacent to the top surface of the steering wheel as provided with the unitary compact horn blowing mechanism also provides a padding to cushion impact of an operator relative to the steering wheel whenever a collision or sudden movement occurs whereby an operator is thrown against the steering wheel.

In the event a cement is used for bonding together the soft resilient elastomeric material of the relatively harder material, a fast curing rubber cement can be used which consists of polychloroprene dissolved in toluol and containing magnesium oxide and sulfur as curing agents, carbon black and a suitable anti-oxidant and organic accelerator. A suitable natural rubber base cement which can be used includes natural rubber dissolved in naphthol or toluol containing sulfur and stearic acid as curing agents, carbon black and an appropriate anti-oxidant and organic accelerator.

It is to be understood that in molding upper and lower portions 18 and 20 for the steering wheel and horn blowing mechanism, in accordance with the present invention, suitable molds having cavity forming means therewith are provided to shape at least five slots in the upper portion 20 and to shape the cut-out 10c or recess section of the lower portion 18. After the upper and lower portions have been molded, they are preferably partially vulcanized or cured and thereafter a suitable cement can be applied between mating parts. However, assembly can be made with or without cementing if the mating parts are snapped into locking engagement with each other followed by completion of curing by use of a suitable mold or pressure fixture wherein heat and pressure are applied to bond the parts firmly together. It is to be understood that the material used for the upper and lower portions must be sufficiently soft and resilient to permit withdrawal of the upper and lower portions from a core or mold adapted to form the specific structure and slot shapes shown in the drawings. After formation of the annular ring or rim section 20, the horn blowing mechanism contacts are formed as an assembly 40 which is insertable and removable as a unit relative to the steering wheel in accordance with the present invention. Due to this feature of having the horn blowing mechanism insertable and removable as a unit, the spring means 30 and a flat annular plate 32 are always spaced an equal distance apart, and horn energization can be easily obtained by applying pressure to the outer surface 20a of the ring 20.

While the embodiment of the present invention as herein disclosed constitutes a preferred form, it is to be understood that other forms might be adopted.

What is claimed is as follows:

1. A horn blowing switch assembly adapted to be mounted relative to a steering wheel rim portion having an insulated metal core, comprising, an annular ring of resilient and relatively soft elastomeric material having one intermediate slot, an annular spring means partially embedded in the slot of said ring and having an arcuate portion exposed laterally, said annular ring having a pair of coplanar slots spaced a predetermined distance to one side of said spring means and intermediate slot, and a substantially flat annular plate having opposite ends inserted in the coplanar slots and adapted to have a surface spaced equi-distantly from said spring means which is adapted to be displaced for closing an electrical contact relative to the surface of said plate, said plate having a predetermined location fixed by said coplanar slots relative to the insulated metal core and said spring means.

2. The assembly of claim 1 wherein said elastomeric ring provides a pair of projections relative to the intermediate slot, said projections being adapted to retain said spring means in the slot with less than 180° lateral exposure of said spring means adapted for electrical contact relative to said flat plate at the predetermined location.

3. A horn blowing switch mechanism adapted to be mounted as a compact and replaceable unit in locking engagement with a steering wheel rim portion having an insulated metal core, comprising, an annular ring of resilient elastomeric material having a central portion and slotted side flange portions, said side flange portions being complementary to and adapted to lock into engagement with the steering wheel rim portion at a location spaced radially outwardly from the insulated metal core, an annular spring means retained relative to said central portion of said elastomeric ring, and an annular metal plate retained by the slotted side flange portions, said metal plate having a location always a predetermined distance away from said spring means which is substantially concentrically located relative the plate electrically engageable by said spring means.

4. The switch mechanism of claim 3 wherein said annular ring has a total of at least five slots including a pair of slots in said slotted side flange portions, including a substantially centrally located slot in which said spring means is retained in said central portion, and a pair of empty slots on opposite sides of said central portion and extending radially outwardly a substantial distance for enhancing resilience thereof to facilitate displacement of said central portion of said elastomeric ring that retains said spring means at the predetermined distance for electrical engagement relative to said plate always insulated from the metal core of the steering wheel rim portion.

5. An improved steering wheel and horn switch assembly, comprising, a steering wheel lower rim portion connected by spokes to a central hub, said lower rim portion having an insulated metal core and having a cutout section providing radially inner and outer wall portions angularly displaced from each other as well as extending in a radial direction and interconnected by shoulder means extending substantially transversely relative to said radial wall portions, an annular relatively soft and resilient elastomeric ring having opposite laterally outwardly extending flange portions adapted to lock and dove-tail into engagement with said rim portion shoulder means, said laterally outwardly extending flange portions including a pair of coplanar slots opposite each other, an annular metal plate retained in the coplanar slots, and an annular spring means retained in said elastomeric ring at a predetermined equal distance and concentrically relative to said plate, said spring means being deflectable with said ring and adapted to engage said plate electrically for horn energization while both said spring means and said plate are insulated from the metal core.

6. The assembly of claim 5 wherein said elastomeric ring has a pair of empty slots on opposite sides of said spring means and extending substantially radially outwardly for enhancing resilience of said ring with said spring means relative to said annular plate, said annular plate being located tangentially relative to said rim portions.

7. The assembly of claim 5 wherein opposite edges of said plate are supported in said laterally outwardly extending flange portions and are adapted to enhance rigidity and locking engagement of said flange portions relative to said shoulders.

8. In a steering wheel and horn blowing switch assembly having an annular spring means and including an insulated metal core in a steering wheel rim portion having a semi-annular radial recess therein relative to which an annular ring of resilient and relatively soft elastomeric material is fitted, the improvement which comprises providing the elastomeric ring with at least five slots including a pair of coplanar slots in laterally extending side flange portions of said ring, a substantially centrally located slot in which the annular spring means is retained, an annular metal plate retained in the coplanar slots at a predetermined continuously equal distance concentrically relative to the spring means, said metal plate in said coplanar slots having spaced tangential relation to the insulated metal core of the steering wheel rim portion at all times, said metal plate and spring means when in engagement having an improved effect in establishing electrical connection for horn blowing that is facilitated to occur at substantially uniform pressure applied relative to the elastomeric ring of which radial resilience is enhanced due to provision of a pair of empty radially outwardly extending slots located on opposite sides of the spring means and in between said coplanar slots wherein said plate is positioned.

References Cited in the file of this patent

UNITED STATES PATENTS

| | | |
|---|---|---|
| 1,913,855 | Pohjola | June 13, 1933 |
| 2,575,926 | Murray | Nov. 20, 1951 |

FOREIGN PATENTS

| | | |
|---|---|---|
| 1,110,551 | France | Oct. 12, 1955 |